(12) United States Patent
Dukat

(10) Patent No.: US 9,241,597 B2
(45) Date of Patent: Jan. 26, 2016

(54) APPARATUS FOR HERB GRINDING AND RELATED METHODS

(71) Applicant: Dane Dukat, Mesa, AZ (US)

(72) Inventor: Dane Dukat, Mesa, AZ (US)

( * ) Notice: Subject to any disclaimer, the term of this patent is extended or adjusted under 35 U.S.C. 154(b) by 0 days.

(21) Appl. No.: 14/309,467

(22) Filed: Jun. 19, 2014

(65) Prior Publication Data

US 2015/0298136 A1   Oct. 22, 2015

Related U.S. Application Data

(63) Continuation-in-part of application No. 29/488,715, filed on Apr. 22, 2014, now Pat. No. Des. 714,595.

(51) Int. Cl.
*A47J 42/00* (2006.01)
*A47J 42/14* (2006.01)
*A47J 42/12* (2006.01)
*A47J 42/32* (2006.01)

(52) U.S. Cl.
CPC *A47J 42/14* (2013.01); *A47J 42/12* (2013.01); *A47J 42/32* (2013.01)

(58) Field of Classification Search
CPC ........... A47J 42/00; A47J 42/12; A47J 42/14; A47J 42/20; A47J 42/32; A47J 42/34

USPC .................... 241/168, 169.1, 273.3
See application file for complete search history.

(56) References Cited

U.S. PATENT DOCUMENTS

| | | | |
|---|---|---|---|
| 4,280,666 A * | 7/1981 | Jones | 241/169.1 |
| D378,653 S * | 4/1997 | Richardi | D7/679 |
| D447,920 S * | 9/2001 | Lillelund | D7/679 |
| 7,367,519 B2 * | 5/2008 | de Groote et al. | 241/169.1 |
| 7,422,170 B2 * | 9/2008 | Bao | 241/168 |
| D594,288 S * | 6/2009 | Mah | D7/678 |
| 8,083,167 B1 * | 12/2011 | Namakian et al. | 241/169.1 |
| 8,393,563 B2 * | 3/2013 | Chaoui et al. | 241/168 |
| D702,398 S * | 4/2014 | Fakhouri et al. | D27/181 |
| 8,733,679 B2 * | 5/2014 | Camitta | 241/30 |
| D714,595 S * | 10/2014 | Ducey | D7/679 |
| 2003/0015611 A1* | 1/2003 | Teng | 241/169.1 |
| 2007/0262182 A1* | 11/2007 | de Groote et al. | 241/169.1 |
| 2009/0212142 A1* | 8/2009 | Greiner | 241/93 |
| 2014/0217213 A1* | 8/2014 | Edwards et al. | 241/69 |

* cited by examiner

*Primary Examiner* — Faye Francis
(74) *Attorney, Agent, or Firm* — Booth Udall Fuller, PLC

(57) ABSTRACT

The present invention relates to grinding devices for dried plants and herbs. The herb grinder features four tiers for cutting and collecting the dried herbs. The grinder features arced cutters, a tier for collecting the cut herbs and an additional tier for separating the cut herbs from the ultra-fine pollen particles.

18 Claims, 8 Drawing Sheets ively driven by a motor, which can generate heat and potentially damage the herb. Electronic grinders are also expensive. For grinding a small quantity of herbs, a manual grinder can achieve a similar result to an electric grinder with minimal effort at a lower cost.

APPARATUS FOR HERB GRINDING AND RELATED METHODS

CROSS-REFERENCE TO RELATED APPLICATIONS

This application is a continuation in part of Ser. No. 29/488,715 filed on Apr. 22, 2014.

STATEMENT REGARDING FEDERALLY SPONSORED RESEARCH OR DEVELOPMENT

Not applicable.

BACKGROUND OF INVENTION

1. Field of the Invention

The disclosed subject matter is in the field of herb grinders and related methods of use.

2. Background of the Invention

An herb grinder is a mechanical device for pulverizing dried herbs, spices, tobacco, and other dried plants into particulates. Grinding the herb into particulates allows for the herb to be used in cooking or for the herb to be more readily smoked. Herb grinders can be either manual or electronic. Electronic grinders are typically driven by a motor, which can generate heat and potentially damage the herb. Electronic grinders are also expensive. For grinding a small quantity of herbs, a manual grinder can achieve a similar result to an electric grinder with minimal effort at a lower cost.

Most manual grinders have two pieces with cooperating cylindrical-shaped pegs or pyramidal shaped pegs that pulverize the herb when the pieces are moved relative to one another, See, e.g., U.S. Pat. No. 8,393,563. The use of pyramidal-shaped pegs to grind herbs is problematic because the tips can break off and get mixed within the herbal mixture. This can be potentially dangerous if the grinder is made of a plastic polymer because smoking plastics could create serious health consequences for the smoker. Grinders that employ the use of cylindrical pegs are also problematic because the cylindrical pegs do not completely grind the herb. With a cylindrical peg based grinder, either a user will have to exert additional effort to grind the herb or the user will have to be content with an incompletely ground product.

Other problems arise in connection with manual grinders that employ cylindrical or pyramidal pegs. Often, the grinding mechanisms are not sharp or the grinding mechanisms are not properly aligned for pulverizing the herb. In either case, the initial turning of the grinder is difficult. Thus, a need exists for grinders with sharp and aligned blades.

SUMMARY OF THE INVENTION

It is an object of the present invention to grinder that finely grinds herbs with minimal effort.

It is another object of the present invention to create a grinder that is not easily prone to breakage.

Disclosed is an herb grinder comprising: a first tier with arced cutters; a second tier comprising arced cutters that are in complimentary positions to the arced cutters in the first tier and holes; a third tier with a mesh screen; and, a fourth tier with a basin.

BRIEF DESCRIPTION OF THE FIGURES

The manner in which these objectives and other desirable characteristics can be obtained is explained in the following description and attached figures in which.

DETAILED DESCRIPTION OF THE INVENTION

Disclosed is an herb grinder comprising: a first tier with arced cutters; a second tier comprising (a) arced cutters that are in complimentary positions to the arced cutters in the first tier, and (b) holes; a third tier with a mesh screen; and, a fourth tier.

Figure 1:
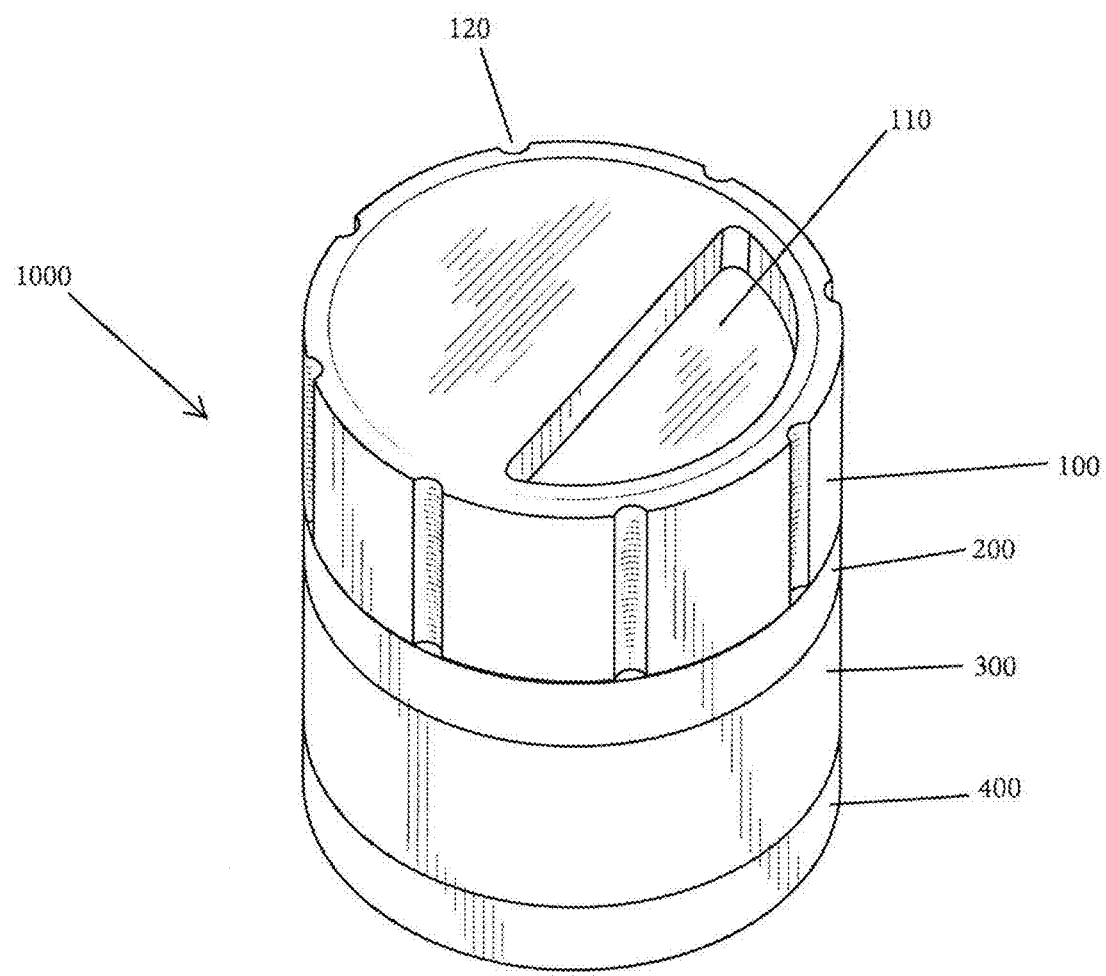
FIG. 1 is a perspective view of a grinder.
Figure 2:
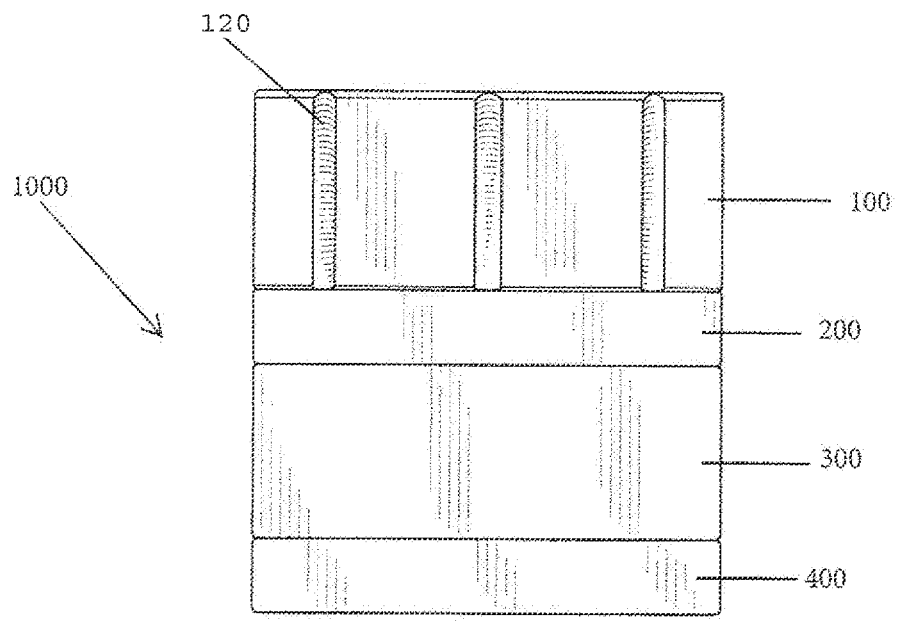
FIG. 2 is a front view of the grinder of FIG. 1.
Figure 3:
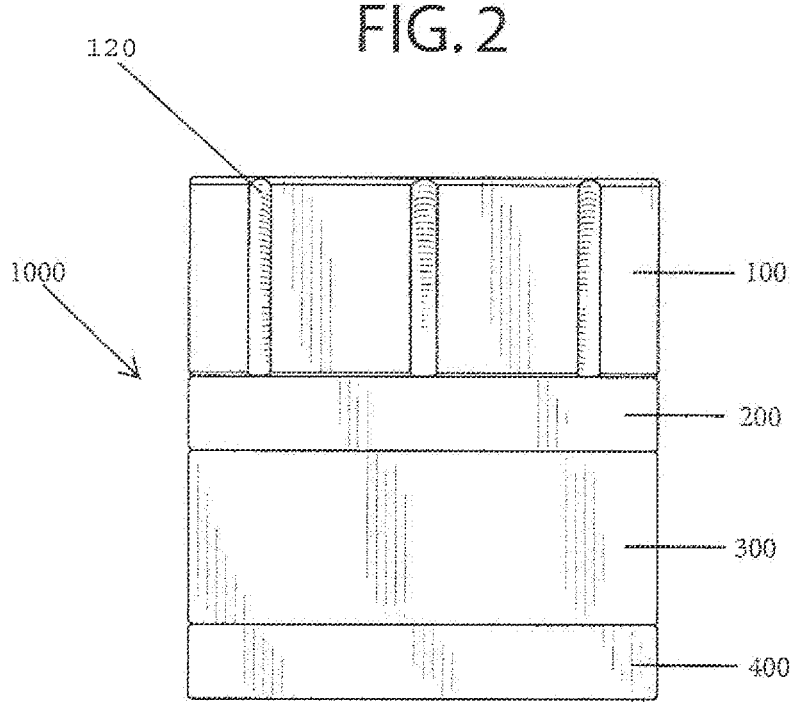
FIG. 3 is a rear view of the grinder of FIG. 1.
Figure 4:
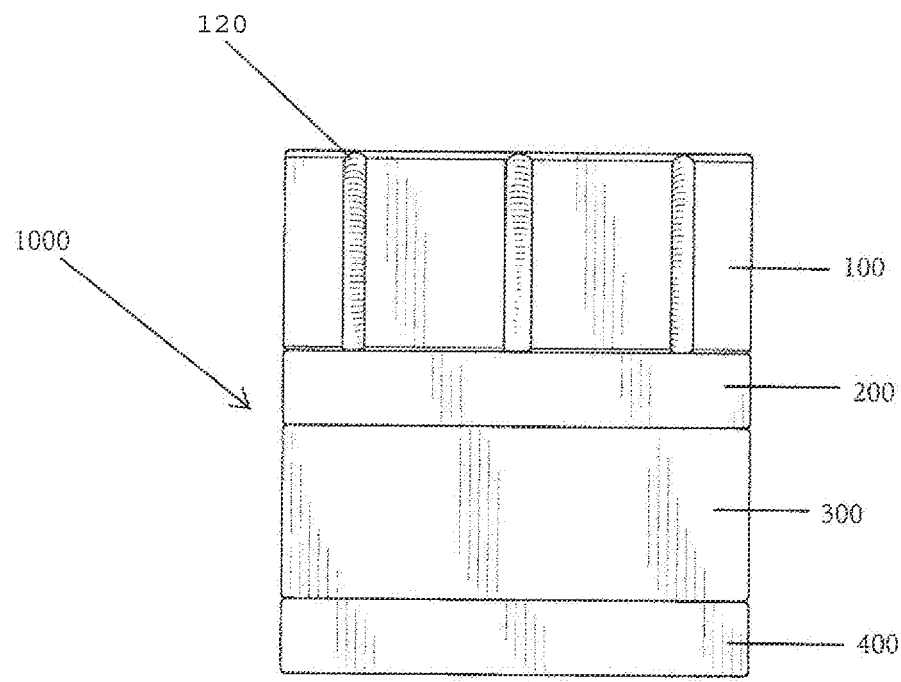
FIG. 4 is a left side view of the grinder of FIG. 1.
Figure 5:
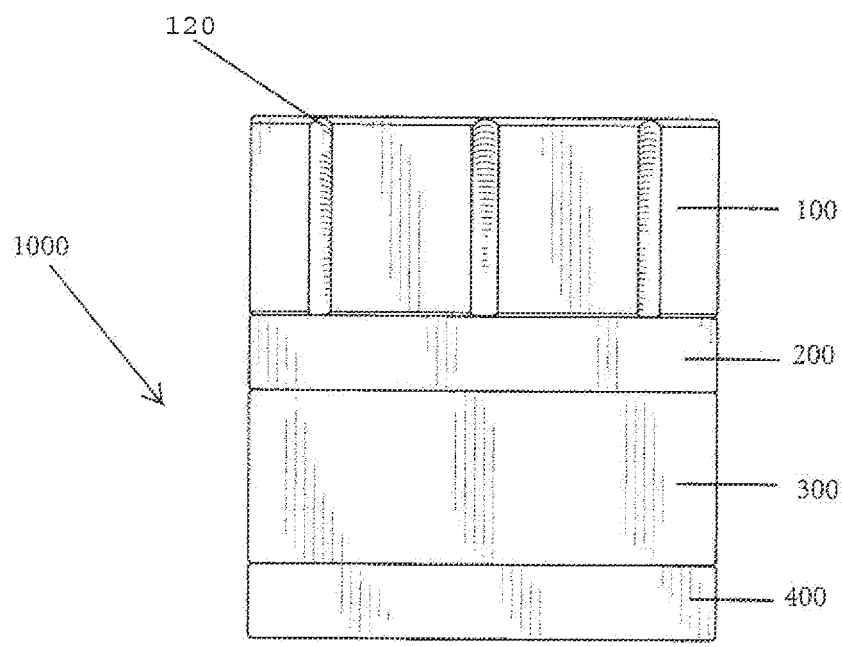
FIG. 5 is a right side view of the grinder of FIG. 1.
Figure 6:
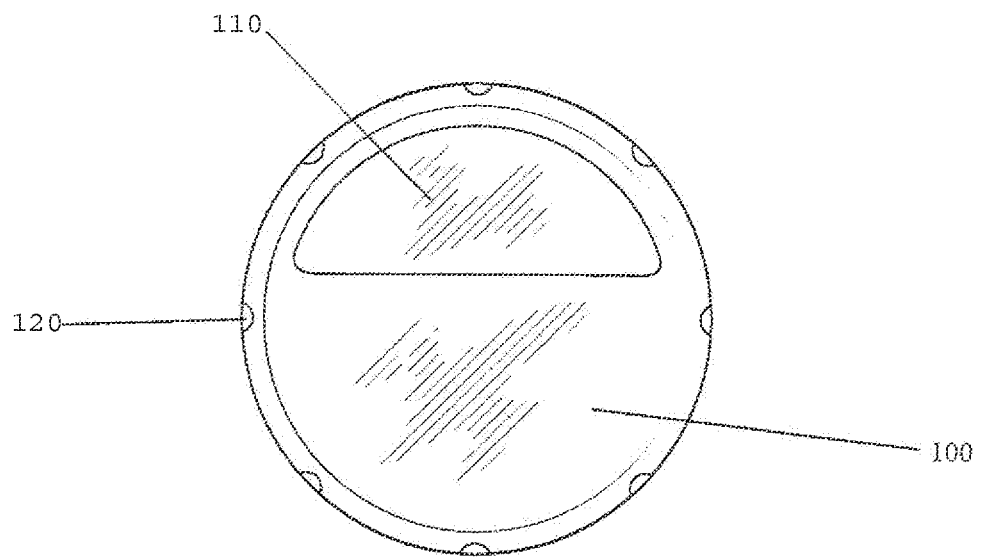
FIG. 6 is a top view of the grinder of FIG. 1.
Figure 7:
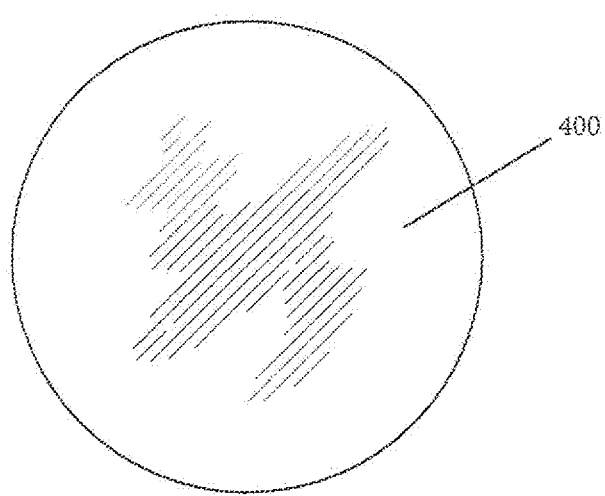
FIG. 7 is a bottom view of the grinder of FIG. 1.

FIG. 1 shows a perspective view of the grinder 1000. In the embodiment shown, the grinder 1000 is made up of four tiers a first tier 100, a second tier 200, a third tier 300, and a fourth tier 400. The grinder 1000 can be constructed from acrylic, wood, plastic, polycarbonate, aluminum, titanium, or another metal. Metal is the preferred material.

The top tier 100 suitably features grooves 120 on the side and an basin 110 in the surface of the tier 100. The grooves 120 on the side of the tier 100 assist the user with the turning motion that grinds the herb. The basin 110 is preferably crescent shaped. The basin 110 is preferably half a centimeter deep. Once a user has ground up an herb, the user can put the herb into the basin 110. The basin 110 allows the user to neatly pour the herb into a rolling paper to be smoked.

FIGS. 4-7 depict front, back, left side, right side, top, and bottom views of the grinder 1000.

Figure 8:
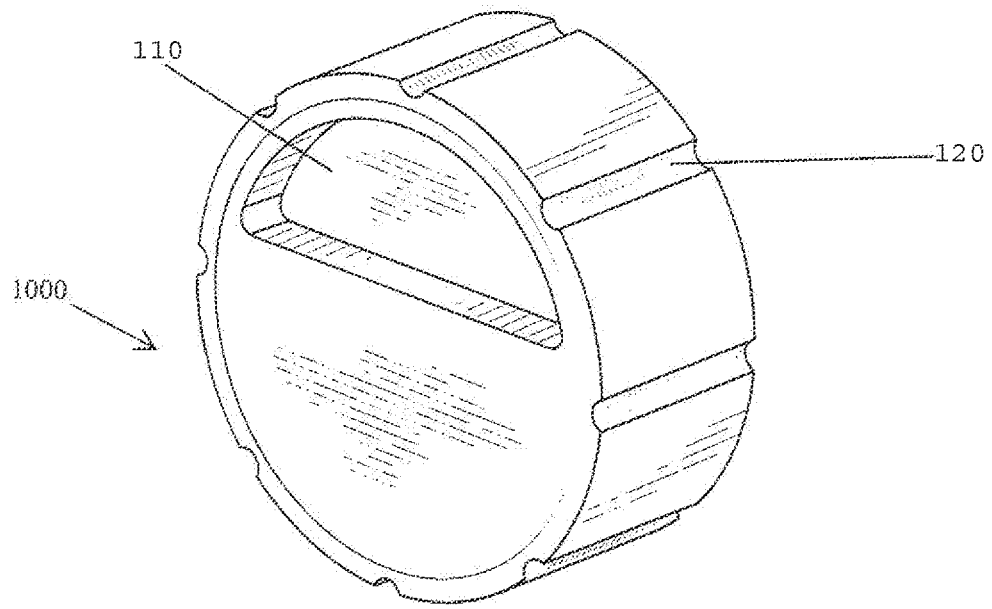
FIG. 8 is a front perspective view of the top tier of the grinder.
Figure 9:
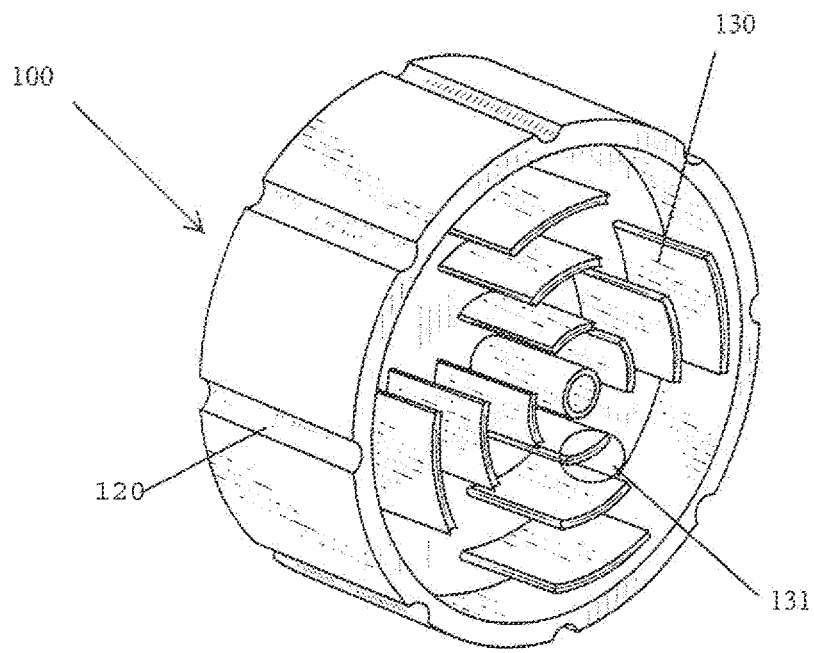
FIG. 9 is back perspective view of the top tier of the grinder.

FIGS. 8 and 9 show front perspective and back perspective views of the first tier 100 of the grinder 1000. FIG. 8 shows the front of the first tier 100. The grooves 120 and the basin 110 are visible in this view. FIG. 9 shows the other side of the top tier 100. On the other side of the top tier 100 are cutters 130. The cutters 130 are the mechanisms that grind the herb. The cutters 130 are preferably arced. In the preferred embodiment, the cutters form a cross pattern with smaller arcs toward the center and larger arcs toward the circumference. On the tips of the cutters 130 are blades 131. The blades 131 are sharp enough that they can easily cut through a dried herb, but not so sharp that they will slice a finger or other body part if a user lightly brushes against a blade 131 by accident. Preferably, the blades are made from aluminum, titanium, or some other metal to easily cut through the herb, but the cutters 130 may also be made from acrylic, polycarbonate, or another form of plastic.

Figure 10:
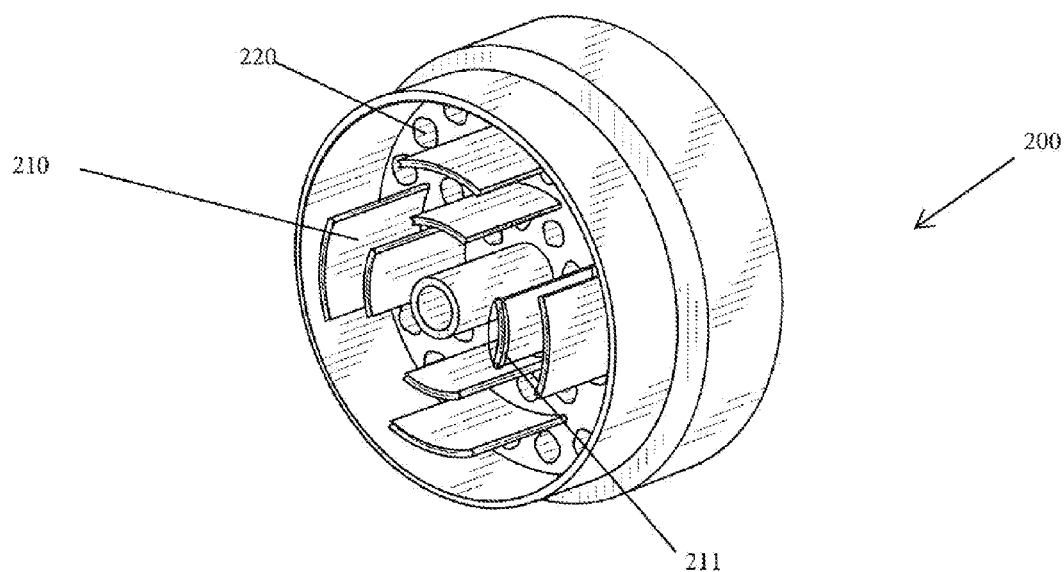
FIG. 10 is a front perspective view of the second tier of the grinder.

FIG. 10 is a front perspective view of the second tier 200. The second tier 200 features cutters 210 with blades 211. Like the cutters 130 on the top tier 100, the cutters 210 on the second tier 200 are arced. The second tier 200 cutters 210 are designed to fit between the cutters 130 on the top tier 100. These cutters 210 are also preferably made from aluminum, titanium, or another metal, but may be made from acrylic, polycarbonate, or another form of plastic. The second tier 200 also features holes 220. The holes 220 separate the smaller, ground up pieces of herbs from the larger unground portions.

Figure 11:
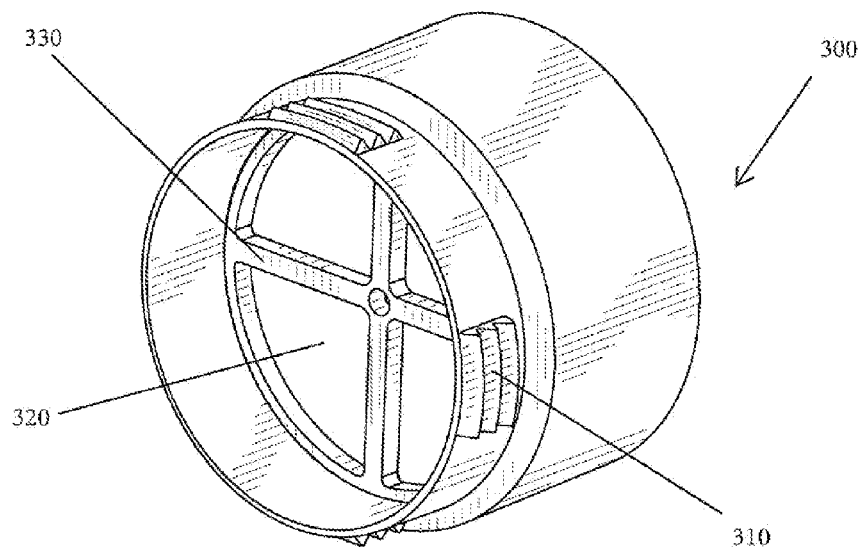
FIG. 11 is a front perspective view of the third tier of the grinder.

FIG. 11 depicts a front perspective view of the third tier 300. The third tier 300 features male threading 310 on the side. The male threading 310 acts as a quick locking mechanism that fits into corresponding female threading (not shown) on the second tier 200. In the preferred embodiment, there are four equidistant male threadings 310 that are approximately one half inch. This locking mechanism allows for the second and third tiers 200, 300 to be locked in place while a user is grinding an herb. The locking mechanism allows for a user to unfasten the second and third tiers 200, 300 much quicker than the typical threaded mechanisms where the entire circumference of a tier would be threaded. In the preferred embodiment, the third tier 300 features a cross bar 330 that allows for the pollen screen 320 to be removed and replaced. The third tier also features a pollen screen 320. The pollen screen 320 is a fine mesh screen. This screen filters out the ultra-fine particles, or trichomes, from the rest of the ground up herb. The pollen screen 320 is constructed of a metal or cloth mesh.

Figure 12:
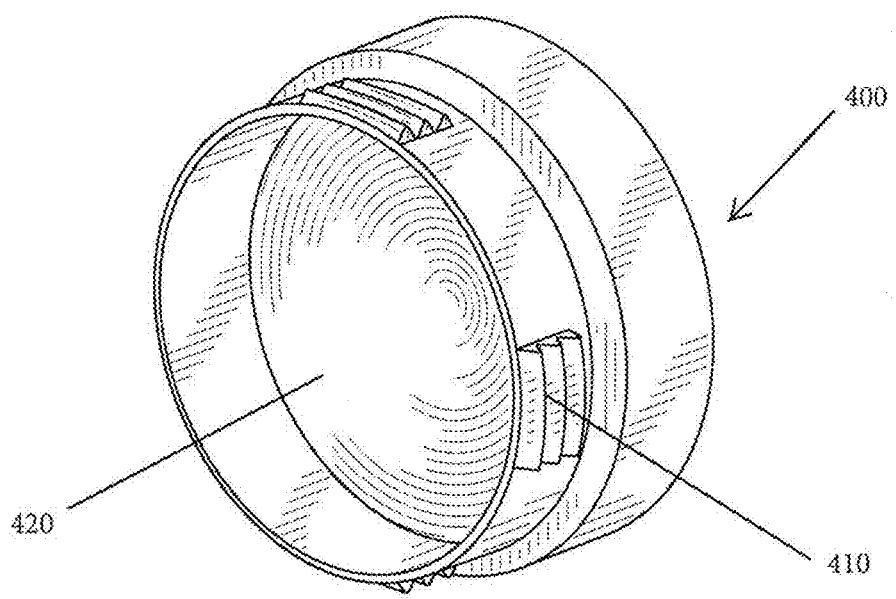
FIG. 12 is a front perspective view of the fourth tier of the grinder.

FIG. 12 depicts a front perspective view of the fourth tier 400. The fourth tier 400 features a male threading 410 similar to the male threading 310 between the second and third tiers 200, 300. This male threading 410 fits into a female threading (not shown) on the third tier 300. The fourth tier 400 acts as a pollen catcher. Pollen that is sifted from the ground herb through the pollen screen 320 will collect in the interior 420 of the fourth tier. The pollen screen 320 is detachable from the grinder 1000.

Figure 13:
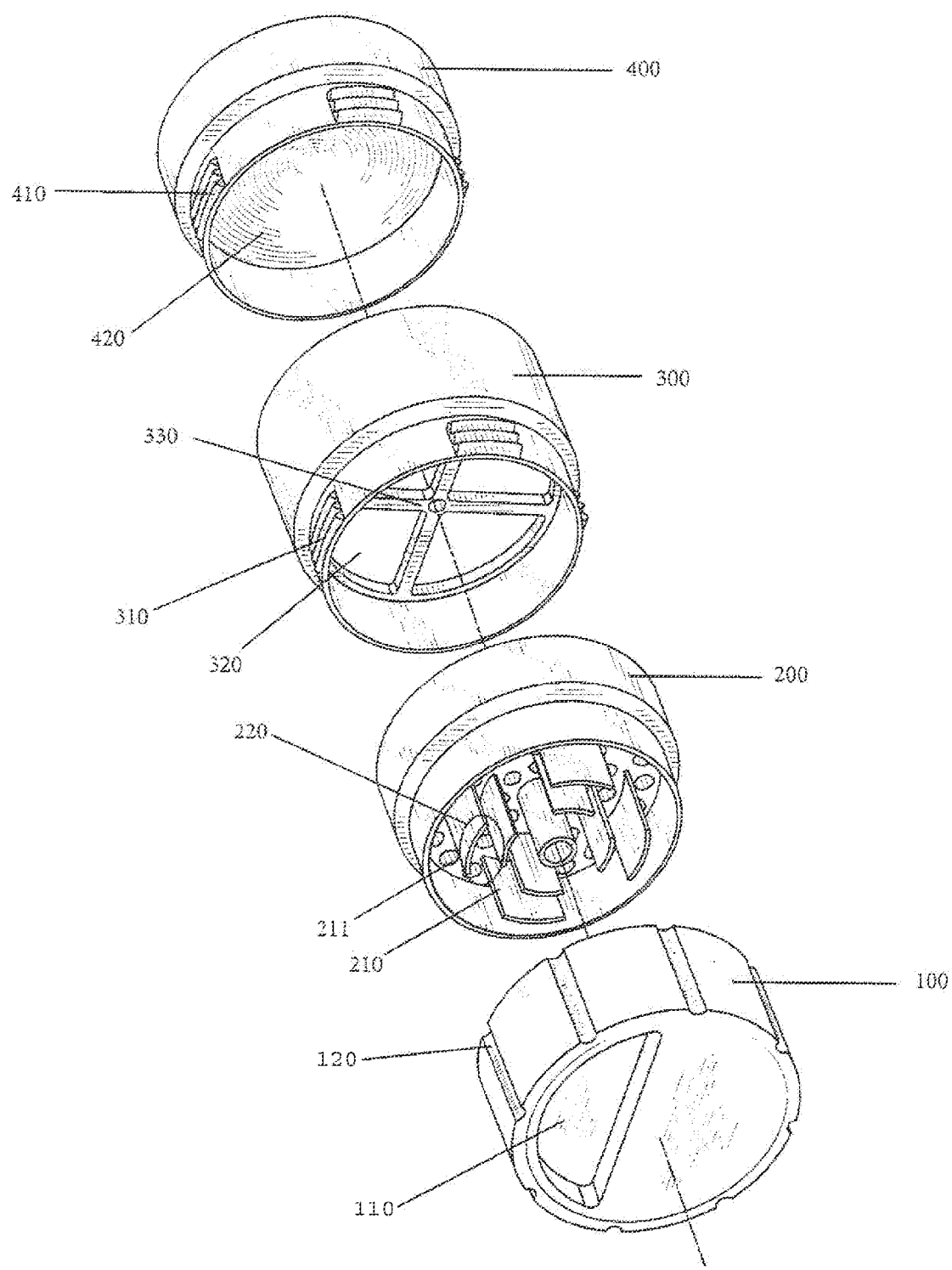
FIG. 13 is an exploded view of the grinder that shows all four tiers.

FIG. 13 depicts an exploded view of the four tiers 100, 200, 300, 400, and shows how they fit together. In order to use the grinder 1000, a user will remove the first tier 100 from the grinder 1000. A user then places a dried herb on top of the second tier 200. The user returns the top tier 100 to the top of the grinder 1000. The user then twists the top tier 100 of the grinder 1000. The groves 110 on the top tier 100 assist the user in twisting the top tier 100. The twisting motion forces the herb to be sliced and ground by the cutters 130, 210. The herb will be ground into smaller pieces. The smaller pieces will fall through the holes 220 in the second tier 200 to the pollen screen 320 in the third tier 300. The ultra-fine pollen particles will go through the pollen screen 320 where they will collect in the basin basin 420 of the fourth tier 400.

Any element in a claim that does not explicitly state "means for" performing a specified function, or "step of" in the clause as specified in 35 U.S.C. §112, paragraph 6 may not be intended as a means plus claim.

Other features will be understood with reference to the drawings. While various embodiments of the method and apparatus have been described above, it should be understood that they have been presented by way of example only, and not of limitation. Likewise, the various diagrams might depict an example of an architectural or other configuration for the disclosed method and apparatus, which is done to aid in understanding the features and functionality that might be included in the method and apparatus. The disclosed method and apparatus is not restricted to the illustrated example architectures or configurations, but the desired features might be implemented using a variety of alternative architectures and configurations. Indeed, it will be apparent to one of skill in the art how alternative functional, logical or physical partitioning and configurations night be implemented to implement the desired features of the disclosed method and apparatus. Also, a multitude of different constituent module names other than those depicted herein might be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "module" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

The invention claimed is:

1. A herb grinder comprising:
   a first tier with arced cutters;
   a second removable tier comprising arced cutters that are in complementary positions to the arced cutters in the first tier and holes;
   a third tier removably coupled to the second tier opposite the first tier and comprising a cross bar positioned within the third tier and a detachable mesh screen coupled to the cross bar; and, a fourth tier removably coupled to the third tier opposite the second tier and comprising a basin.

2. A herb grinder according to claim 1 wherein the cutters on the first and second tiers have blades on the ends of them.

3. A herb grinder according to claim 2 further comprising a locking mechanism between the second and third tiers.

4. A herb grinder according to claim 3 further comprising a locking mechanism between the third and fourth tiers.

5. A herb grinder according to claim 4 wherein the locking mechanisms consist of a series of four equidistant male threadings and corresponding female threadings approximately one half inch long.

6. A herb grinder according to claim 1 wherein the first tier comprises a basin on a top surface of the first tier, the basin being sized to hold ground herb therein.

7. A herb grinder according the claim 6 wherein the basin is semi-circular and approximately ½ cm deep.

8. A herb grinder according to claim 7, wherein the arced cutters of the first tier and the arced cutters of the second tier form a cross pattern wherein smaller arcs are toward the center of the grinder and larger arcs are toward the circumference of the grinder.

9. A herb grinder according to claim 8 constructed from metal.

10. A herb grinder according to claim 8 constructed from plastic.

11. A herb grinder, comprising:
a first tier comprising a basin that is at least ½ cm deep on a top surface of the first tier and a plurality of cutters opposite the basin;
a second tier removably and rotatably coupled to the first tier and comprising a plurality of cutters positioned complementary to the plurality of cutters of the first tier and a plurality of holes;
a third tier removably coupled to the second tier opposite the first tier, the third tier comprising a cross bar extending across an interior channel of the third tier and a detachable mesh screen coupled to and supported by the cross bar; and
a fourth tier removably coupled to the third tier opposite the second tier, the fourth tier comprising an interior basin positioned to collect ground herbs that fall through the plurality of holes of the second tier and the mesh screen of the third tier.

12. The herb grinder of claim 11, wherein the third tier is removably coupled to the second tier with four male threadings positioned equidistant from one another and extending approximately ½ inch around a side perimeter of the third tier, each of the four male threadings configured to engage with one of four corresponding female threadings on the second tier, and wherein the fourth tier is removably coupled to the third tier with four male threadings positioned equidistant from one another and extending approximately ½ inch around a side perimeter of the fourth tier, each of the four male threadings configured to engage with one of four corresponding female threadings on the third tier.

13. The herb grinder of claim 11, wherein the plurality of cutters of the first tier and the plurality of cutters of the second tier each comprise a blade on a tip of the respective cutter.

14. The herb grinder of claim 11, wherein the plurality of cutters of the first tier and the plurality of cutters of the second tier each comprise arced cutters positioned in complementary arc patterns.

15. A herb grinder, comprising:
a first tier comprising a plurality of cutters;
a second tier removably and rotatably coupled to the first tier and comprising a plurality of cutters positioned complementary to the plurality of cutters of the first tier and a plurality of holes;
at least a third tier removably coupled to the second tier opposite the first tier, the at least third tier comprising an interior basin positioned to collect ground herbs that fall through the plurality of holes of the second tier, wherein the at least third tier is removably coupled to the second tier with four male threadings positioned equidistant from one another and extending approximately ½ inch around a side perimeter of the third tier, each of the four male threadings configured to engage with one of four corresponding female threadings on the second tier.

16. The herb grinder of claim 15, wherein the first tier comprises a semi-circular basin on a top surface that is at least ½ cm deep.

17. The herb grinder of claim 15, wherein the plurality of cutters of the first tier and the plurality of cutters of the second tier each comprise a blade on a tip of the respective cutter.

18. The herb grinder of claim 15, wherein the plurality of cutters of the first tier and the plurality of cutters of the second tier each comprise arced cutters positioned in complementary arc patterns.

* * * * *